DRY HEAT SETTING REFRACTORY AND METHODS OF USING SAME

This is a division of application Ser. No. 38,918, filed May 14, 1979.

BACKGROUND OF THE INVENTION

Since the invention of the "bottom-pour" ladle, more than one hundred years ago, nozzles have been "set" in nozzle blocks by smearing wet fireclay on the nozzle and pushing the nozzle into place in the nozzle block. Then the ladle is heated with a gas or oil flame until the fireclay is dried and has set. This heating consumes many hours. It is imperative that the fireclay be completely dry, as any moisture trapped under molten steel or other hot molten metal will instantly flash into high pressure steam which can explode dangerously, throwing hot molten metal in all directions.

Although fireclay has and is being used extensively for setting nozzles, its use has other disadvantages. The thermal bond or "set" that it forms is weak and occasionally breaks during teeming. The nozzle then floats to the top surface of the molten metal which rushes out through the nozzle block in a disastrously uncontrollable stream which cannot be poured into a mold or tundish and so must be discarded as scrap. In addition, such uncontrolled pouring is extremely hazardous to personell working in the plant.

Wet "air-setting" refractories are used to a limited degree to set a nozzle in a nozzle block. These are smeared on the nozzle before inserting it into the nozzle block and also must be carefully fired to remove the last traces of moisture before using the nozzle in a pour. These refractories contain chemical bonds, typically liquid sodium silicate, which when dried forms a strong bond. Consequently the nozzle is strongly cemented to the nozzle block from top to bottom. Punching the nozzle out after using it results in severe damage to the nozzle block which must be replaced after one or only a few pours. As nozzle blocks are large and heavy, they are expensive and time-consuming to remove and replace, air-setting mortars are not generally used for nozzle-setting.

Accordingly, one of the principal objects of the present invention is to provide rapid heat-setting refractories which can be used to hold in place nozzles employed for pouring steel or other molten metals. These refractories are granular and dry. They may be poured into the annular space between nozzles and their nozzle blocks which are normally located in the bottom of the ladles, tundishes or other vessels used for holding and pouring hot molten metal. It is then not necessary to heat the refractory to high temperatures before use as the heat from molten metal tapped into even a cold ladle hardens the refractory, so that the refractory, nozzle and nozzle block are almost instantly cemented together. The rapidity of this cementing action prevents the nozzle, usually made of fireclay or other ceramic material which has considerably lower specific gravity than molten metals, such as steel, from floating out of the nozzle block when the stopper-rod is raised for "teeming" or pouring the steel through the nozzle.

An additional advantage of using these dry, heat-setting refractories is that only the top few inches of the nozzle are cemented to the nozzle block. Thus after the heat or batch of molten metal has been poured the used nozzle can be easily punched out with minimum damage to the nozzle block. Nozzles are generally used only once. Nozzle blocks, if not damaged when the used nozzles are punched out, can last through the full life of the ladle lining which, in typical steel plant use may be fifteen to thirty pours or more.

Thus it is another principal object of this invention to provide a reliable dry heat setting refractory which allows a nozzle to be removed from a nozzle block after use without damaging the nozzle block.

It is still another major object of this invention to provide a quick and inexpensive method of setting nozzles. This method requires less skill to be used successfully and it saves considerable time and energy because it does not require any preheating prior to use in pouring hot molten metals, such as steel or other substances.

Our method does not require the hours of preheating presently necessary to dry fireclay and other refractories currently in use. Our method also provides a stronger bond than does fireclay so that accidents resulting from inadvertent breaking of the bond between the nozzle and nozzle block are obviated.

These and other objects and advantages will become apparent hereinafter.

DETAILED DESCRIPTION

Those refractories suitable for use in the present invention can be made from a large variety of refractory grains including, but not limited to magnesite, dense alumina, mullite and other prepared alumino-silicates and natural refractory igneous rocks. Such a material is crushed so that all passes a 0.25" sieve, and preferably a 0.15" sieve. The resulting crushed grains are separated into two or more size fractions and the smallest size fraction should comprise five to sixty percent of the whole and it should be ground in a ball mill or other suitable comminuting device so that most of it passes a U.S. 200 mesh screen. These fractions are then carefully re-blended, the purpose being to provide a grain size distribution which will smoothly and rapidly flow into the annular space between nozzle and nozzle block which is typically only about 0.25" wide and by the action of gravity alone to form the most dense, least porous filling possible. Space limitations make tamping virtually impossible and the size and weight of most ladles make them virtually impossible to vibrate to effect consolidation of the grains.

Additives well known in the art to produce free-flowing, such as fractional-percentage amounts of glacial acetic acid, or various amounts of substances for other purposes, depending upon the characteristics of the particular grains employed, may be required. An example of such a product made from natural magnesite containing 87% MgO (periclase) is as follows:

| | | |
|---|---|---|
| Coarse Fraction: | Magnesite (87% MgO), sized -0.147" + U.S. 12 Mesh | 33.0% |
| Intermediate Fraction: | Magnesite (87% MgO), sized -U.S. 12 Mesh + U.S. 70 Mesh | 43.0% |
| Fine Fraction: | Magnesite (87% MgO), sized 80% -U.S. 200 Mesh | 20.0% |
| | Hydrated Sodium Silicate | 4.0% |
| | Total | 100% |

These fractions are blended carefully in an intensive mixer and packaged in multiwalled paper bags containing about sixty pounds each. This product is suitable for steel plant use.

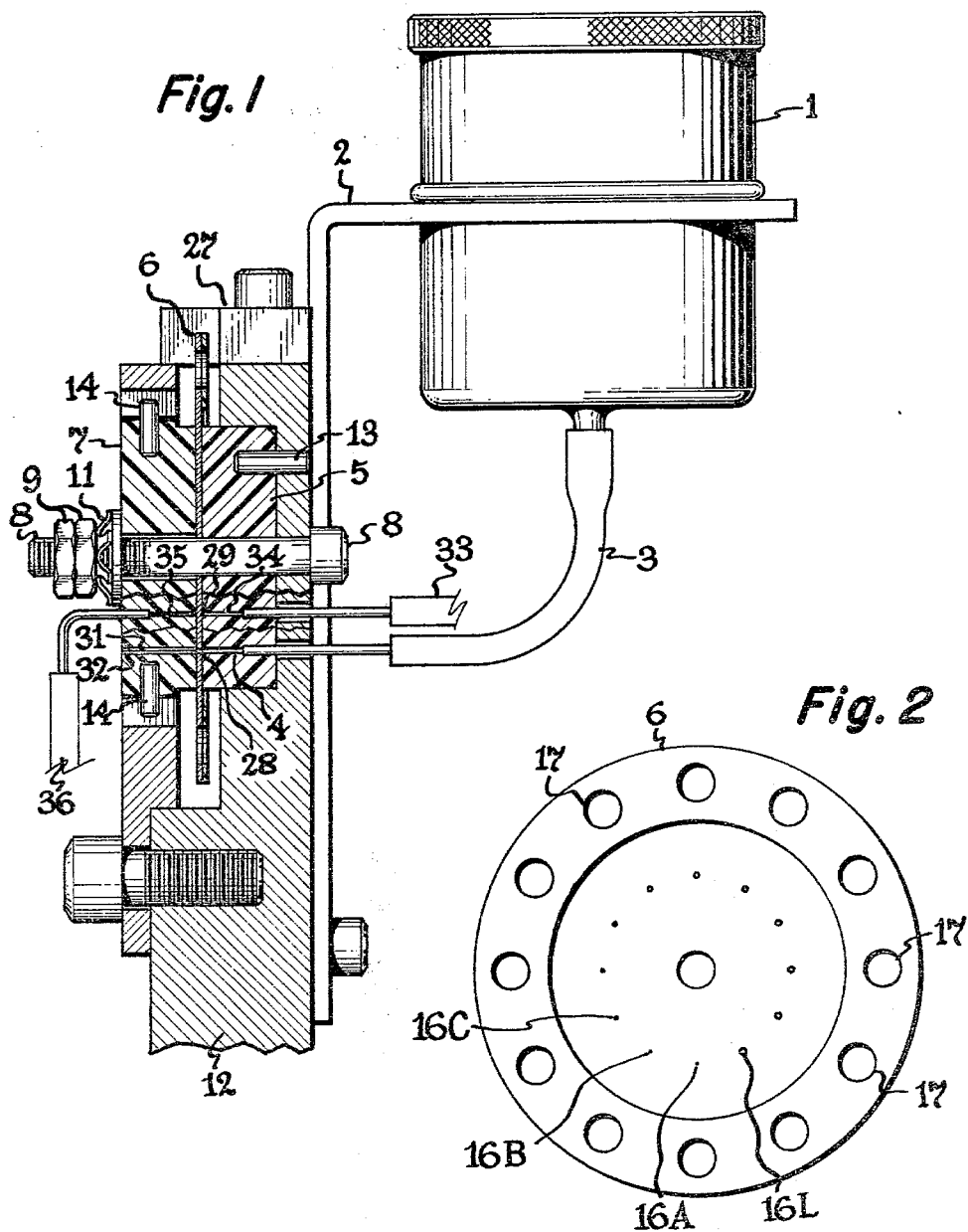

MERCURY DOSER

The invention relates to a mercury doser or mechanical device for dispensing mercury in the manufacture of discharge lamps and similar devices.

BACKGROUND OF THE INVENTION

In the manufacture of electric discharge lamps or devices which utilize an ionizable medium containing mercury, it is always necessary to exercise care in introducing the mercury into the lamp in order to avoid contamination. Some lamps such as the common fluorescent lamp operate with a saturated mercury vapor and contain mercury in excess of the quantity vaporized in operation. With such lamps, accuracy in dispensing the dose is not of cardinal importance. However with high intensity discharge lamps which operate with the mercury dose totally vaporized, accuracy is important because the vapor pressure in operation depends upon the quantity of mercury which was dispensed into the arc tube. In metal halide lamps which contain both mercury and one or more metal halides, accurate control of the mercury dose is even more important for the further reason that the color of the radiation emitted by the lamp depends upon the proportion of the various ingredients. To assure a lamp product which is constant in color and performance, accurate control of the mercury dose is essential. In the manufacture of miniature metal halide lamps, the quantity of mercury dispensed per lamp is less than in conventional size lamps. This means that in order to have the same relative accuracy, even greater precision must be used in measuring and dispensing the required charge.

An example of mercury dispensing or dosing apparatus currently used in electrical discharge lamp manufacture is described in U.S. Pat. No. 2,313,657 - Marshaus (1943) Apparatus for Feeding Mercury. I have found that the methods currently used are not suitable and the available equipment is not fast enough nor precise and accurate enough for use with high speed production equipment in the manufacture of low wattage high intensity discharge lamps.

SUMMARY OF THE INVENTION

The object of the invention is to provide a mercury doser capable of automatically dosing arc tube bodies with high precision and quantitative accuracy at very high production rates, for instance at 2000 lamps per hour. A convenient way of selecting the size of the charge is desirable. The doser must avoid contamination of the charge and preferably should be compatible with a dry gas charge transport system.

In accordance with the invention, a measured quantity or charge of mercury is segregated by filling a sized cavity in a metering plate with mercury from a reservoir. Any gas present in the cavity escapes through a vent port so small that the mercury is prevented by its surface tension from passing through it. The metering plate is then moved to place the cavity at an unloading station where the charge is released for transport to the place of utilization.

In a preferred embodiment, the sized cavity is a selected one of several holes in a stainless steel microhoned metering plate sandwiched between tetrafluoroethylene discs. The mercury is fed by gravity into the selected hole while the plate is indexed into a loading position where any gas trapped in the hole escapes through a very fine vent port. The plate is then advanced to an unloading position where a puff of argon gas expels the charge through a discharge port into a delivery channel. Gas flow carries the charge through the delivery channel to the place of utilization, and the plate is returned to the filing position for the next cycle.

DESCRIPTION OF DRAWINGS

FIG. 1 is a side view, partly sectioned, of a mercury doser embodying the invention.

FIG. 2 is a frontal view of the metering plate.

DETAILED DESCRIPTION

Figure 3:
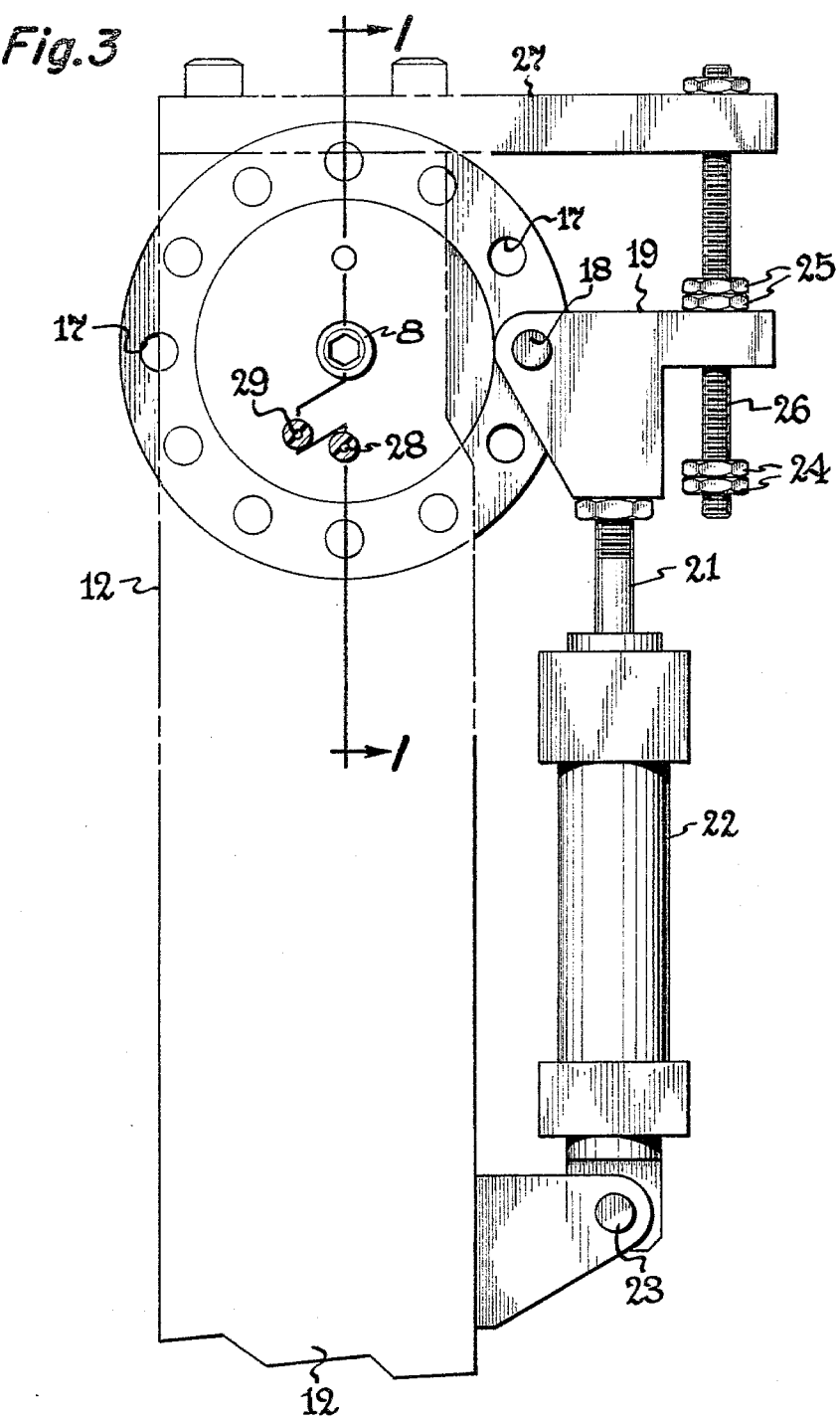
FIG. 3 is a front elevation of the doser, partly in phantom showing the air cylinder indexer.

The mercury doser shown in the drawings may be mounted on a suitable standard close to the station where it is desired to deliver mercury into a lamp body. Referring to FIG. 1, container 1 supported by bracket 2 holds a quantity of mercury and serves as a reservoir. The mercury is gravity-fed through a conduit formed by tubing 3 leading into inlet port 4 in tetrafluoroethylene (TEFLON) block or disc 5 which engages the rear side of metering plate 6. A corresponding tetrafluoroethylene block or disc 7 engages the front side of the metering plate and the two discs and the plate are held and pressed together by threaded bolt 8, hex nuts 9 and spring washer 11. The rear disc is prevented from turning relative to frame or body member 12 supporting the entire assembly by locking pin 13, and the front disc 8 is similarly restrained by the two pins 14.

Referring to FIG. 2, metering plate 6 is made of material that is not wetted by mercury, suitably stainless steel (304 stainless is preferred). The plate has a flatness and surface finish adequate to effectively eliminate loss of mercury by leakage or as a result of clinging to surface irregularities; a surface finish of three light bands or four microns is adequate. The blocks or discs 5, 7 must be of a material not wetted by mercury and which makes a seal when pressed against the steel metering plate. A self-lubricating plastic such as tetrafluoroethylene which can withstand heat up to 400° C. is preferred. The discs 5 and 7 are finished to a quality corresponding to the finish of the metering plate. The plate has a series of holes graduated in size, twelve in all, starting with the smallest 16A and progressing clockwise to the largest 16L. These are metering holes defining volumes bounded by the flat surfaces of the tetrafluoroethylene discs on each side. The choice of hole determines the weight of liquid mercury dispensed at each action or cycle, from 2 to 10 milligrams for the illustrated plate which is 3" in diameter and has a thickness of 0.032".

The metering hole is chosen by selecting the appropriate coupling hole 17 for engagement by wrist pin 18 of clevis 19 as shown in FIG. 3. The clevis is carried on the piston 21 of an air cylinder 22 which is hingedly mounted at 23 relative to body member 12. The air cylinder moves the clevis vertically between limits determined by locking pairs of nuts 24, 25 on threaded rod 26 which depends from bracket 27 fastened to the top of the body member. The stop nuts 24, 25 are adjusted such that the selected metering hole is indexed into loading position 28 at the upper limit, and into unloading position 29 at the lower limit. The weight of the mercury charge is conveniently changed by pulling wrist pin 18 and engaging it in another coupling hole 17 corresponding to the appropriate metering hole.

In FIG. 1 for ease of illustration, the unloading position 29 has been displaced upwardly and is shown above the loading position 28, in accordance with section lines 1—1 in FIG. 3. At the loading position the mercury, gravity-fed through inlet port 4, fills metering hole 16. Any gas trapped in the hole escapes through a very fine vent port. One way of providing such a fine hole is to press a short piece of hypodermic needle 31 into passage 32 in disc 7. A suitable length of hypodermic needle is about a half inch long with a 0.004 i.d. hole through it, the piece terminating flush with the inner face of disc 7 engaging the metering plate. The surface tension of mercury is more than enough to prevent the mercury from entering such a small hole under the available pressure head from the reservoir. Thus the selected metering hole 16 is filled with mercury and carries this volume of mercury to the unloading position when the metering plate is indexed. At the unloading position a puff of argon gas is supplied through tubing 33 into passage 34 and expels the mercury charge out through discharge port or passage 35. From passage 35, the mercury charge is blown through delivery tube 36, or transported by other appropriate means, into the lamp body for which it is intended.

Tests conducted on a doser embodying the invention and corresponding to that illustrated in the drawings show freedom from contamination and ±1% accuracy in dispensing an 8 milligram dose of mercury. Operation at rates up to 2000 actions or cycles per hour present no difficulty and the weight of the mercury charge is readily changed to any of the 12 values in the metering plate. Thus the stated objectives of the invention have been fully met.

What I claim as new and desire to secure by Letters Patent of the United States is:

1. A mercury doser for dispensing a measured charge of mercury or similar substance comprising:
    a reservoir for mercury,
    means defining a conduit for mercury extending from said reservoir to a metering plate,
    said metering plate being smooth-faced, of material not wetted by mercury, and having a hole through it forming a sized cavity for accommodating a measured charge of mercury,
    smooth-faced blocks of material not wetted by mercury engaging opposite sides of said metering plate and means pressing the blocks against the plate in order to seal thereto, said conduit extending through one block to said plate at a loading position, the other block having a vent port leading from said plate at the loading position, said port being so fine that surface tension prevents mercury from passing through it,
    means defining a delivery channel extending from said plate through one block at an unloading position,
    and means for moving said metering plate so as to shift said sized cavity back and forth between the loading and the unloading positions and dispense a charge of mercury corresponding thereto at each cycle.

2. A mercury doser as in claim 1 including means for supplying a puff of gas into said cavity at the unloading station whereby to expel the mercury charge and blow it through said channel.

3. A mercury doser as in claim 1 wherein the metering plate contains a series of holes defining a number of sized cavities, and wherein said means for moving said plate allows selection among said cavities for shifting back and forth between loading and unloading positions.

4. A mercury doser as in claim 1 wherein the metering plate is made of stainless steel and said blocks are made of a resilient plastic having self-lubricating properties.

5. A mercury doser for dispensing a measured charge of mercury or similar substance comprising:
    a reservoir for mercury,
    means defining a conduit for supplying mercury by gravity flow, said conduit extending from said reservoir to a metering plate,
    said metering plate being smooth-faced, pivotally-mounted, and of material not wetted by mercury, said plate having a circularly-disposed series of graded holes through it forming sized cavities for accommodating measured charges of mercury,
    a pair of smooth-faced blocks of material not wetted by mercury engaging opposite sides of said metering plate and means pressing the blocks against the plate in order to seal thereto, said conduit extending through one block to said plate at a loading position, the other block having a vent port leading from said plate at the loading position, said port being so fine that surface tension prevents mercury from passing through it,
    means defining a delivery channel extending from said plate through one block at an unloading position,
    means for rocking said metering plate,
    and means for selecting one of said sized cavities for oscillation back and forth between the loading and the unloading positions whereby the charge of mercury dispensed at each cycle will correspond to the selected cavity.

6. A mercury doser as in claim 5 including means for supplying a puff of gas into the selected cavity at the unloading station whereby to expel the mercury charge and blow it through said channel.

7. A mercury doser as in claim 5 wherein the metering plate is made of stainless steel and said blocks are made of a resilient plastic having self-lubricating properties.

8. A mercury doser as in claim 7 wherein the blocks are made of tetrafluoroethylene.

* * * * *